United States Patent
Christensen et al.

(10) Patent No.: US 10,351,139 B2
(45) Date of Patent: Jul. 16, 2019

(54) METHOD AND SYSTEM FOR SMART USE OF IN-CAR TIME WITH ADVANCED PILOT ASSIST AND AUTONOMOUS DRIVE

(71) Applicant: VOLVO CAR CORPORATION, Gothenburg (SE)

(72) Inventors: Claus Christensen, Copenhagen S (DK); Christian Hedegaard, Valby-Copenhagen (DK); Thomas Bove, Copenhagen K (DK)

(73) Assignee: Volvo Car Corporation, Gothenburg (SE)

(*) Notice: Subject to any disclaimer, the term of this patent is extended or adjusted under 35 U.S.C. 154(b) by 21 days.

(21) Appl. No.: 15/205,200

(22) Filed: Jul. 8, 2016

(65) Prior Publication Data
US 2017/0008523 A1    Jan. 12, 2017

(30) Foreign Application Priority Data
Jul. 10, 2015 (EP) .................................... 15176183

(51) Int. Cl.
*B60W 30/182* (2012.01)
*G06Q 10/06* (2012.01)
(Continued)

(52) U.S. Cl.
CPC ......... *B60W 30/182* (2013.01); *G05D 1/0061* (2013.01); *G05D 1/0088* (2013.01);
(Continued)

(58) Field of Classification Search
CPC .. B60W 30/182; G01C 21/34; G01C 21/3682
See application file for complete search history.

(56) References Cited

U.S. PATENT DOCUMENTS 8,509,982 B2 *  8/2013  Montemerlo ........ G05D 1/0055
                                                  701/26
9,188,985 B1 * 11/2015  Hobbs .................... G01C 21/34
(Continued)

FOREIGN PATENT DOCUMENTS

DE    102013008605 A1    11/2014
WO      2014191657 A1    12/2014

OTHER PUBLICATIONS

Extended European Search Report and Written Opinion for related European application No. EP 15176183.0 dated Jan. 19, 2016, 10 pages.
(Continued)

*Primary Examiner* — Hussein Elchanti
*Assistant Examiner* — Michael A Berns
(74) *Attorney, Agent, or Firm* — Brooks Kushman P.C.

(57) ABSTRACT

A system and method for planning activities for a driver of a vehicle, where a scheduled route is planned for the vehicle, include an assignment unit configured for assigning a pilot assisted driving mode to a first part of the scheduled route and assigning an autonomous driving mode a second part of the scheduled route, the assignment of the driving mode determined based on a first parameter. An interface is configured for indicating the first and second parts of the scheduled route to the driver, and a proposal unit is configured for, upon execution of the assigned driving mode in the vehicle, proposing a first activity to the driver for the first part of the scheduled route and a second activity for the second part of the scheduled route, the proposal of an activity determined based a second parameter.

10 Claims, 4 Drawing Sheets

(51) Int. Cl.
*G05D 1/00* (2006.01)
*G05D 1/02* (2006.01)
*B60W 50/14* (2012.01)

(52) U.S. Cl.
CPC ......... *G05D 1/0212* (2013.01); *G05D 1/0274* (2013.01); *G05D 1/0278* (2013.01); *G06Q 10/06* (2013.01); *B60W 50/14* (2013.01); *B60W 2550/12* (2013.01); *B60W 2550/141* (2013.01); *B60W 2550/20* (2013.01); *B60W 2600/00* (2013.01); *B60W 2900/00* (2013.01); *G05D 2201/0213* (2013.01)

(56) References Cited

U.S. PATENT DOCUMENTS

| | | | |
|---|---|---|---|
| 9,528,850 B1* | 12/2016 | Hobbs | G01C 21/34 |
| 10,036,648 B1* | 7/2018 | Hobbs | G01C 21/34 |
| 2010/0082376 A1 | 4/2010 | Levitt | |
| 2015/0051933 A1 | 2/2015 | Chakra et al. | |
| 2015/0166069 A1* | 6/2015 | Engelman | B60W 30/12 |
| | | | 701/23 |
| 2016/0093211 A1 | 3/2016 | Giesler et al. | |

OTHER PUBLICATIONS

Communication Pursuant to Article 94(3) EPC, issued by the European Patent Office, European Application No. 15176183.0, dated Feb. 2, 2018 (8 pages).

\* cited by examiner

METHOD AND SYSTEM FOR SMART USE OF IN-CAR TIME WITH ADVANCED PILOT ASSIST AND AUTONOMOUS DRIVE

CROSS-REFERENCE TO RELATED APPLICATIONS

This application claims foreign priority benefits under 35 U.S.C. § 119(a)-(d) to European patent application number EP 15176183.0, filed Jul. 10, 2015, which is incorporated by reference in its entirety.

TECHNICAL FIELD

Example embodiments presented herein are directed towards a system, vehicle, interface and method in a vehicle for planning activities for a driver of the vehicle, where a scheduled route is planned for the vehicle to drive along.

BACKGROUND

An autonomous vehicle is one which is capable of sensing its environment and navigating without the use of human input. It is envisioned that such vehicles will be capable of transitioning from an autonomous driving mode and a manual driving mode, in which a driver manually operates the vehicle. It is further envisioned that such autonomous driving may only be allowed on preapproved or certified roads or zones. Thus, a vehicle's initial driving segment will likely require the human driver to control the vehicle and later transition to an autonomous driving mode. While in an autonomous driving mode, a driver of a vehicle may engage in activities which may not be possible while the vehicle is in a manual driving mode. Examples of such activities are sleeping, working or using multimedia applications. Final segment may be initiated by the driver taking back control of the vehicle to depart the certified road and driving manually until destination is reached.

SUMMARY

Disclosed is a system in a vehicle for planning activities for a driver of the vehicle. A scheduled route is planned for the vehicle to drive along. The system comprises an assignment unit. The assignment unit is configured for assigning a pilot assisted driving mode to one or more first parts of the scheduled route. The assignment unit is configured for assigning an autonomous driving mode to one or more second parts of the scheduled route. The assignment of the driving mode is determined based on one or more first parameters. The system comprises at least one interface configured for providing or indicating or displaying or visualizing the one or more first and second parts of the scheduled route to the driver. The system comprises a proposal unit. The proposal unit is configured for, upon execution of the assigned driving mode in the vehicle proposing one or more first activities to the driver for the one or more first parts of the scheduled route. The proposal unit is configured for, upon execution of the assigned driving mode in the vehicle proposing one or more second activities to the driver for the one or more second parts of the scheduled route. The proposal of the activity is determined based on one or more second parameters.

Disclosed is also a vehicle comprising the system according to the above.

Disclosed is also an interface for planning activities for a driver of a vehicle, where a scheduled route is planned for the vehicle to drive along, wherein the interface is configured for:

indicating/displaying/visualizing one or more first and second parts of the scheduled route to the driver;

where the one or more first parts of the scheduled route are assigned a pilot assisted driving mode by an assignment unit; and where the one or more second parts of the scheduled route are assigned an autonomous driving mode by the assignment unit;

where the assignment of the driving mode is determined based on one or more first parameters;

where the assigned driving modes are executed in the vehicle for the respective first and second parts of the route by an execution unit;

where one or more first activities are proposed to the driver for the one or more first parts of the scheduled route by a proposal unit; and where one or more second activities are proposed to the driver for the one or more second parts of the scheduled route by the proposal unit;

where the proposal of the activity is determined based on one or more second parameters.

Disclosed is also a method for planning activities for a driver of a vehicle, where a scheduled route is planned for the vehicle to drive along, wherein the method comprises:

assigning a pilot assisted driving mode to one or more first parts of the scheduled route by an assignment unit; and assigning an autonomous driving mode to one or more second parts of the scheduled route by the assignment unit;

where the assignment of the driving mode is determined based on one or more first parameters;

indicating/displaying/visualizing the one or more first and second parts of the scheduled route to the driver by at least one interface;

executing the assigned driving modes in the vehicle for the respective first and second parts of the route by an execution unit;

proposing one or more first activities to the driver for the one or more first parts of the scheduled route by a proposal unit; and proposing one or more second activities to the driver for the one or more second parts of the scheduled route by the proposal unit;

where the proposal of the activity is determined based on one or more second parameters.

Disclosed is also a computer readable medium comprising program instructions for planning activities for a driver of a vehicle, where a scheduled route is planned for the vehicle to drive along, wherein execution of the program instructions by one or more processors of a computer system causes the one or more processors to carry out the steps of:

assigning a pilot assisted driving mode to one or more first parts of the scheduled route; and assigning an autonomous driving mode to one or more second parts of the scheduled route;

where the assignment of the driving mode is determined based on one or more first parameters;

indicating/displaying/visualizing the one or more first and second parts of the scheduled route to the driver;

executing the assigned driving modes in the vehicle for the respective first and second parts of the route;

proposing one or more first activities to the driver for the one or more first parts of the scheduled route; and proposing one or more second activities to the driver for the one or more second parts of the scheduled route;

where the proposal of the activity is determined based on one or more second parameters.

Disclosed is also the computer readable medium further comprising executable instructions causing one or more processors to carry out the steps of the method above.

It is an advantage of the present system, vehicle, interface and method that the different levels of automation of driving is exploited in the best possible way for the driver, such that the driver when driving his vehicle, uses the time in the vehicle most efficiently.

Thus it is an advantage that the system, vehicle, interface, and method comprise assigning the driving modes based on the first parameters, thus the driving modes are identified, calculated and/or selected. The driving modes are executed by setting the vehicle in the respective driving modes. The activities are proposed and thus calculated based on the second parameters.

Vehicles, such as cars will be provided with more advanced driver supports systems like pilot assist and automated driving that will relieve the driver of the task of driving. This will provide the driver for the opportunity of doing more and other things while driving. However, on a daily basis the driver may not be able to predict when and how much time will be available for other tasks, and therefore it may also be challenging for the driver to decide how to best use this available time. Furthermore, the kind of activities the driver will be able to do at different levels of driving automation, such as manual, semi-autonomous, or autonomous driving, vary due to the differences in how aware and present the driver actually needs to be in the different driving modes. Thus it is an advantage to provide the driver with different proposals, recommendations or offerings for activities or tasks which are relevant for the different "free" time intervals and different automation levels that will occur during a scheduled route that the vehicle will be following.

In the United States, the National Highway Traffic Safety Administration (NHTSA) has proposed a formal classification system:

Level 0: The driver completely controls the vehicle at all times.

Level 1: Individual vehicle controls are automated, such as electronic stability control or automatic braking.

Level 2: At least two controls can be automated in unison, such as adaptive cruise control in combination with lane keeping.

Level 3: The driver can fully cede control of all safety-critical functions in certain conditions. The car senses when conditions require the driver to retake control and provides a "sufficiently comfortable transition time" for the driver to do so.

Level 4: The vehicle performs all safety-critical functions for the entire trip, with the driver not expected to control the vehicle at any time. As this vehicle would control all functions from start to stop, including all parking functions, it could include unoccupied cars.

Level 2 corresponds to pilot assisted driving, and level 3 corresponds to autonomous driving.

Other classification systems may exist, where the pilot assisted driving and the autonomous driving is classified or defined differently, however pilot assisted driving is understood to The vehicle may be a car, a truck, a bus, an airplane, a boat etc. The vehicle may be occupied by a driver and possibly one or more other persons. The driver and the one or more other persons may all take part or enjoy the planned activities during the stay or transportation in the vehicle.

The scheduled route which the vehicle is configured to follow may be a predetermined or planned route along a road. The route may be planned by the driver selecting a destination on e.g. a route planning device in the vehicle, such as a GPS receiver. If there is more than one possible route to follow to the destination, the route planning device may present the different route options for the driver, who may then select which one of the possible routes he wishes to drive along. The driver may be presented to details of the different possible routes, such as which parts of the routes are assigned as configured for autonomous driving mode and pilot assisted driving mode, respectively. If the driver prefers to drive as much in autonomous driving mode as possible, this criterion may be applied to the selection of the route. Thus if the driver always prefers to drive as much in autonomous driving mode as possible this may be stored in his personal profile, and the route allowing the most autonomous driving mode may be selected or proposed as preferred by default.

The assignment unit may be called an active safety unit, and this unit is configured for determining or assignment a driving mode to the parts of the route. The assignment or determination is based on one or more first parameters. These parameters may be the type of road on the route, the curvature of the road on the route, traffic conditions on the route, whether conditions on the route, map information of the route etc.

The assignment unit is configured for at least assigning a pilot-assisted driving mode which corresponds to the level 2 of the United States classification system, and an autonomous driving mode which corresponds to the level 3 of the United States classification system. The assignment unit may also be configured for assigning other driving modes, such as the other levels of the United States classification system, such as level 0, 1 and 4.

The vehicle is configured for execution of the assigned driving mode, when the assignment has been performed.

The terms "first part" and "second part" of the route refer to different parts of the route. The term first part corresponds to a pilot assisted driving mode part of the route, and the second part corresponds to an autonomous driving mode part of the route.

The at least one interface is configured for indicating, displaying or visualizing the one or more first and second parts of the scheduled route to the driver. There may be more interfaces than this interface. The interface may be a display, a screen, such as touch screen, a graphical user interface (GUI) etc. The parts of the route may be indicated as time periods, as stretches of a road, as a clock showing time intervals, as a map showing the route. The different parts of the route may be indicated with different symbols, different colors, etc.

The proposal unit is configured for proposing or recommending one or more first and second activities to the driver for the one or more first and second parts of the scheduled route, respectively. The proposals or recommendation may be provided as a list, as symbols etc. The proposals may be provided on the at least one interface or on another interface, such as a screen, such as a touch screen, where the user can touch to select a proposal or recommendation for an activity. The user may also arrange the proposals or recommendations in a preferred order to be retrieved at a later time, e.g. if the driver is driving the same route again, such as driving to/from work. The proposals or recommendations may be provided as audio input to the driver, where the driver can perform the selection of the activity with voice instructions.

The first activities are suitable or allowed to be performed during the first part of the route where the driving mode is the pilot assisted driving mode, thus the driver may not be allowed to perform visual activities such as looking on a screen, e.g. for reading on a web page. The driver may be allowed to perform audio activities such as listening to a pod cast, or speaking on the phone, thus the proposed first activities will comply with the pilot assisted driving mode.

The second activities are suitable or allowed to be performed during the second part of the route where the driving mode is the autonomous driving mode, thus the driver may be allowed to perform visual activities such as looking on a screen, e.g. for reading on a web page. The driver may of course also be allowed to perform the first activities as in the first part of the route where the driving mode is the pilot assisted driving mode, thus the driver may perform audio activities such as listening to a pod cast, or speaking on the phone, also in the second part of the route. Thus the proposed second activities will comply with the autonomous driving mode.

The activities may be digital or internet based activities such as reading from a webpage, listening to a pod cast etc. The activities may be analog activities such as reading a newspaper on paper or speaking on the phone.

The proposal of the first and second activities is determined based on one or more second parameters. The second parameters may be such as a personal profile of the driver such as the driver's preferences, calendar appointments, to-do lists, planned activities, and/or the driving mode of the first and second parts of the routes i.e. the required attention of the driver with regards to the driving of the vehicle.

Thus it is an advantage that when the driver can easily see how much time he will have available at different levels of automation during a trip it will give him a better foundation for how to use the time. Furthermore, by providing proposals for what time could be used for would help the driver get the best out of the in-car time. For example, if there will be a lot of free time, e.g. in the pilot-assisted driving mode, during a trip it will make sense for the driver to listen to an audio book whereas if there is little time it may be smarter to listen to a short podcast or make a phone call.

It is an advantage that the predicted available time in the different automation modes can be determined by knowledge of the destination, route, traffic conditions, road types, such as city, country, motorway, etc., and road characteristics, such as e.g. lane markings. Thus it is an advantage that these parameters can be used to calculate how much autonomy can be expected during the drive.

It is an advantage that the specific activity or content to propose or recommend to the driver in different driving mode situations could be based on various other parameters, such as the time available, type of automation, e.g. allowing high vs low immersion, and a consumer profile of areas of interest etc.

In some embodiments the one or more first parameters comprise one or more of the type of road, traffic conditions, weather conditions, availability of map information. The type of road may be a highway, a motorway, a city street etc. It is an advantage that the assignment of the driving mode is determined based on these kinds of parameters as they may provide the best data or input for determining the driving mode.

In some embodiments the one or more second parameters comprise one or more of a time length of the scheduled part of the route, the driving mode assigned to the scheduled part of the route, a personal profile of the driver, a predefined preference of the driver, calendar appointments, to-do lists, planned activities. The estimated time length of the activity should correspond to the estimated time length of the relevant scheduled part of the route. It is an advantage that the proposal of the activity is determined based these kinds of parameters as they may provide the best input for determining a relevant activity for the driver.

In some embodiments the one or more proposed first activities are based on the requirement of attention of the driver in the one or more first parts of the scheduled route. In the first parts of the route the driving mode is pilot assisted, e.g. corresponding to level 2 of the classification system, where it is required that the driver has visual attention on the road and traffic, but the driver is allowed to listen and speak. Thus it is an advantage that the proposed activities are based on what the driver is required or allowed to do during driving.

In some embodiments the one or more proposed second activities are based on the requirement of attention of the driver in the one or more second parts of the scheduled route. In the second parts of the route the driving mode is autonomous, e.g. corresponding to level 3 in the classification system, where the driver is allowed to look away from the road and traffic in shorter and/or longer time periods. Thus it is an advantage that the proposed activities are based on what the driver is required or allowed to do during driving.

In some embodiments the activities comprise performing phone calls and/or participating in phone conferences.

In some embodiments the activities comprise transmission of media content, and wherein the system comprises a transceiver or computer configured for obtaining access to the internet for allowing the driver to receive the transmitted media content. Alternatively and/or additionally the driver may have a mobile phone in the vehicle and this mobile phone may comprise a transceiver configured for obtaining access to the internet.

In some embodiments the first and the second proposals for activities are customized for the driver. If there are passengers in the vehicle, the first and second proposals for activities may be customized for the group comprising the driver and the one or more passengers. For example if the passengers are children, the proposed activities may comprise family shows, cartoons etc. It is an advantage that the proposals for actives are customized for the driver and/or for any passengers as this ensure that the proposed activities are relevant and interesting for the driver and/or passengers.

In some embodiments the customization of activities in the form of the media content is based on a personal profile of the driver comprising areas of interest and/or gender and/or age and/or predefined media providers and/or predefined preferred media content. The personal profile may be stored e.g., in a cloud storage, and/or stored locally such as in a storage of the system. The areas of interest may comprise e.g. life style, sports, technology, hobbies, etc. The predefined media providers may comprise e.g. specific radio channels or specific TV channels or streaming services. The predefined media content may comprise e.g. a specific radio show, a specific web page, a specific TV show etc. It is an advantage that the customization can be based on such a personal profile which can be defined by the driver himself, and updated whenever it is relevant.

In some embodiments the first proposals for activities comprise audio activities in the form of the driver listening and/or speaking. Thus in the pilot assisted driving mode the driver may be allowed to perform audio activities. The driver may be listening to podcasts, radio, music, performing phone calls etc.

In some embodiments the audio activities comprise media content in the form of audio books and/or podcasts and/or music.

In some embodiments the second proposals for activities comprise visual activities, in the form of the driver looking and/or reading, and/or motion activities, in the form of the driver using his/her hands. Thus in the autonomous driving mode the driver may be allowed to perform visual activities and motion activities.

In some embodiments the visual activities and/or the motion activities comprise media content in the form of browsing the internet and/or reading a text and/or watching a video clip.

In some embodiments the system is configured for providing the driver with an option of storing or listing or remembering an activity to be proposed. This activity may be an activity thought of by the driver himself. The activity can be reminded to the user when the time and driving mode is suitable for the activity, i.e. when a suitable first or second part of the route and thus time period is available. The driver can perform the storing of the activity from home or when he is in the vehicle, e.g. by manual typing or selection from a list, via cloud storage, using a content aggregator etc.

In some embodiments the system is configured for shutting down the media content transmitted to the user, when the one or more first and/or second parts of the scheduled route have been travelled. Thus when the scheduled parts of the route have been travelled or when the time periods expire, then the media content may be blocked or shut down for the driver. This may be a safety precaution if the driver forgets for shut down the activity, e.g. transmission of the media content, when the driving mode changes from e.g. autonomous to pilot assisted. The shutting down of an activity could also be applied for other activities, when the driving mode changes, however a phone call should probably not be shut down, if the driver is in the middle of a conversation. In such case the phone call could be put on hold, until the vehicle has come to a stop, such as the driver has parked the vehicle, or until the driving mode changes again.

In some embodiments the system comprises one or more interfaces, including the at least one interface for indicating or displaying or visualizing or providing the first and second parts of the scheduled route, and wherein the system is configured for displaying on the one or more interfaces each of the types of activities and corresponding lengths of time periods for each activity. Thus more interfaces, such as displays, screens etc., may be provided in the vehicle, e.g. one interface may be provided in the center console, one interface may be provided behind the steering wheel in the dashboard, one interface may be provided at the (front) windscreen etc. One or more of the interfaces may be combined with a GPS receiver. Thus one or more of the interfaces, e.g. the display for the GPS receiver, may provide or display one or more activities, parts of the route and/or time of the parts of the route, e.g. displayed with colors and/or symbols on the route.

In some embodiments the system is configured for displaying media content selected by the driver on the one or more interfaces.

In some embodiments the system is configured for calculating and/or obtaining the one or more first parts of the scheduled route and the one or more second parts of the scheduled route based on one or more of destination and/or route and/or traffic conditions and/or road types and/or road characteristics and/or map information and/or crowd sourcing and/or data logging. The assignment unit or an active safety unit may be performing the calculation or the obtaining. The road types may defined as city roads, country road, and motorway roads, etc. The road characteristics may be lane markings. The maps may be high definition (HD) maps, other maps comprising information, such as comprising extensive information about the surroundings, land marks, the road etc., the maps may comprise lane markings, road curvature etc. The crowd sourcing and/or data logging may be based on information shared from vehicles which drove the scheduled route or part of the scheduled route previously, such as earlier the same day, another day, same time on another day etc. The data may be stored in a cloud storage, it may be shared cloud-to-car, car-to-car, and/or car-to-cloud. The crowd-sourcing and/or data logging may be performed in real-time, such that if it is snowing on the present day, then the data may not be shared as the data will not fit with the conditions, e.g. weather conditions of the present day.

In some embodiments the assignment unit is configured for:

assigning a driving mode, where the vehicle is completely controlled by the driver, to one or more third parts of the scheduled route;

assigning a driving mode, where the vehicle is driving with individual vehicle controls automated, to one or more fourth parts of the scheduled route;

assigning a driving mode, where the vehicle is performing all safety-critical functions for the entire trip, with the driver not expected to control the vehicle at any time, to one or more fifth parts of the scheduled route; and the at least one interface is configured for indicating or displaying or visualizing or providing the one or more third and/or fourth and/or fifth parts of the scheduled route to the driver.

The third parts of the route corresponds to level 0 of the classification system, the fourth parts correspond to level 1 of the classification system and the fifth parts of the route correspond to level 4 of the classification system. In the fourth parts of the route the vehicle is configured to be driving with individual vehicle controls automated, which may such as electronic stability control and/or automatic braking. Thus it is an advantage that more or all driving modes may be assigned to the vehicle by the assignment unit, and that the at least one interface may indicate these corresponding parts of the route associated with the respective driving modes.

In some embodiments the system is configured for selecting the scheduled route from a selection of at least two possible routes, wherein the selection of the route is based on a personal profile of the driver. The personal profile may comprise e.g. calendar appointments, to-do lists, planned activities, personal preferences etc. Thus it is an advantage that the route may be selected such that it allows the driver to perform certain activities, e.g. if the driver prefers to be driving as much in the autonomous driving mode as possible, then the driver may prefer a route allowing more autonomous driving, e.g. 90% of the route, which takes longer time to travel, than a route allowing less autonomous driving, e.g. only 20% of the route, which takes shorter time, because the driver may then be able to relax or do more work while travelling on the route. Thus it is an advantage that the system can select one route out of e.g. two possible routes, based on the driver's personal profile.

BRIEF DESCRIPTION OF THE DRAWINGS

The foregoing will be apparent from the following more particular description of the example embodiments, as illustrated in the accompanying drawings in which like reference characters refer to the same parts throughout the different views. the drawings are not necessarily to scale, emphasis instead being placed upon illustrating the example embodiments.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following description, for purposes of explanation and not limitation, specific details are set forth, such as particular components, elements, techniques, etc. In order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. The example embodiments presented herein are described with the use of a vehicle in the form of an automobile. It should be appreciated that the example embodiments presented herein may be applied to any form of vehicle or means of transportation comprising, for example, cars, trucks, busses and construction equipment, as well as airplanes, boats, ships, and space craft.

Autonomous driving allows an occupant of a vehicle, particularly a driver, to engage in activities that would otherwise not be possible while a vehicle is in a manual driving mode. Thus, at least one example embodiment described herein is to provide a system in which a driver and/or passenger of a vehicle may schedule activities during an autonomous driving mode which may not necessarily be possible during a manual driving mode.

Figure 1:
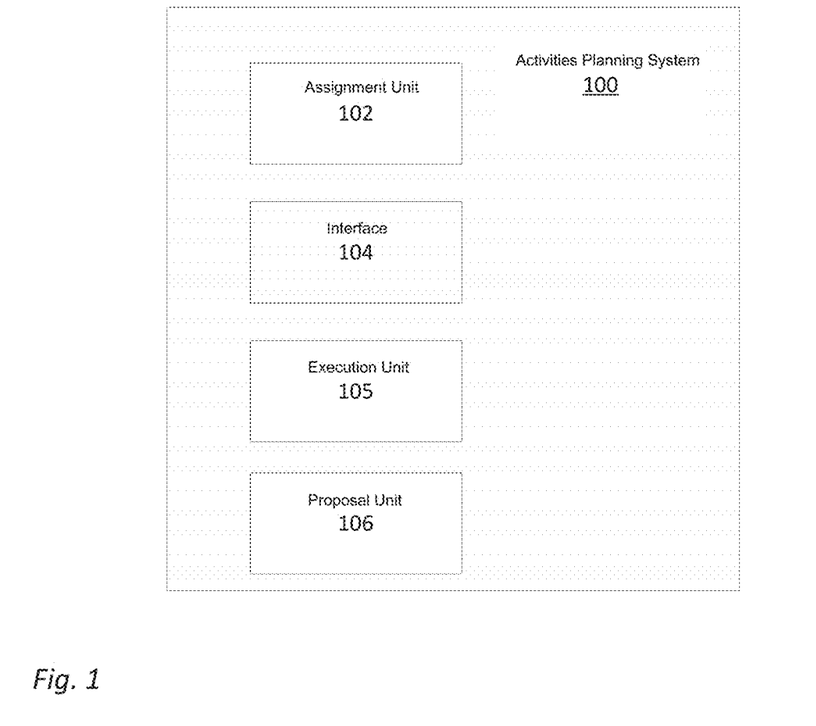
FIG. 1 schematically illustrates an exemplary embodiment of the system.

FIG. 1 schematically illustrates an exemplary embodiment of the system. The system 100 is a system in a vehicle for planning activities for a driver of the vehicle, where a scheduled route is planned for the vehicle to drive along. The system comprises an assignment unit 102 configured for assigning a pilot assisted driving mode to one or more first parts of the scheduled route and assigning an autonomous driving mode to one or more second parts of the scheduled route. The assignment of the driving mode is determined based on one or more first parameters. The system 100 comprises at least one interface 104 configured for indicating the one or more first and second parts of the scheduled route to the driver. The system comprises an execution unit 105 for execution of the assigned driving mode in the vehicle. The system 100 comprises a proposal unit 106 configured for proposing one or more first activities to the driver for the one or more first parts of the scheduled route, and proposing one or more second activities to the driver for the one or more second parts of the scheduled route. The proposal of the activity is determined based on one or more second parameters.

Figure 2:
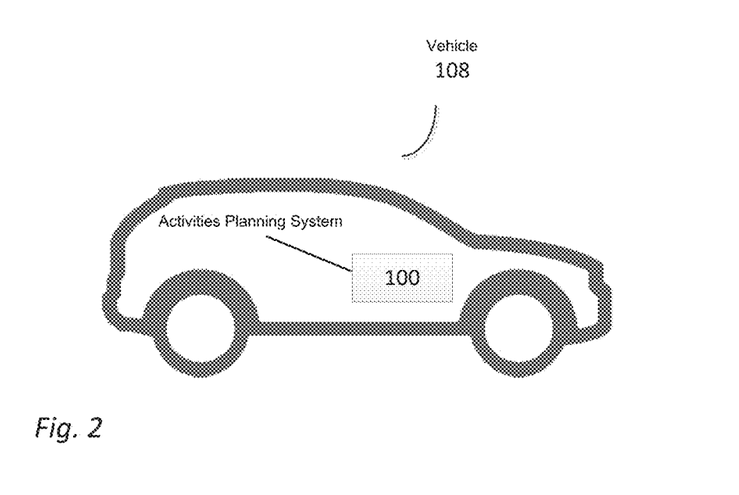
FIG. 2 schematically illustrates an exemplary embodiment of a vehicle.

FIG. 2 schematically illustrates an exemplary embodiment of a vehicle. The vehicle 108 comprises the system 100 of FIG. 1.

FIG. 3 schematically illustrates exemplary embodiments of interfaces in a vehicle.

Figure 3A:
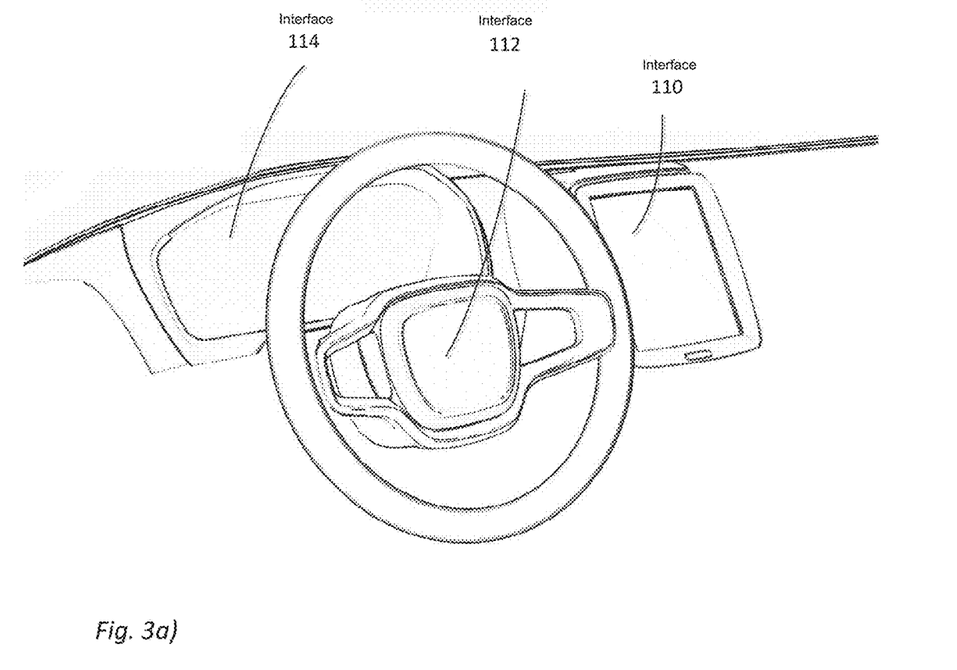
FIG. 3 schematically illustrates exemplary embodiments of interfaces in a vehicle.

FIG. 3a) shows an example of three interfaces in a vehicle. Interface 110 is arranged in the center console of the vehicle and may be an at least one interface. Interface 110 may comprise a GPS receiver for showing a scheduled route planned for the vehicle to drive along. Interface 112 is arranged in the wheel. Interface 114 is arranged in the dashboard behind the wheel.

Figure 3B:
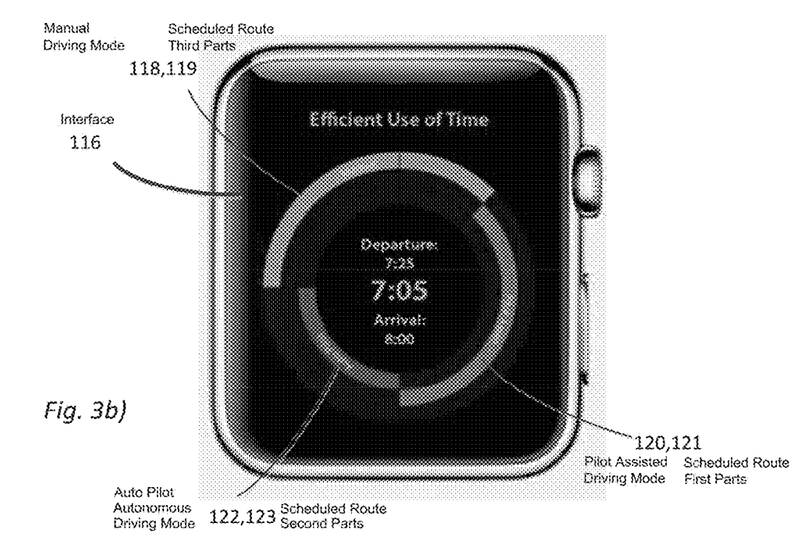

FIG. 3b) shows an example of an interface 116 configured to be arranged in a vehicle. The interface 116 may be arranged in any suitable location in the vehicle, and interface 116 may be an at least one interface. Interface 116 shows the efficient use of time in the vehicle as a number of different circle parts 118, 120, 122 illustrating different driving modes. One driving mode is a manual driving mode 118 corresponding to level 0 of the classification system and corresponding to the third parts 119 of the scheduled route. Another driving mode is a pilot assisted driving mode 120 corresponding to level 2 of the classification system and corresponding to the first parts 121 of the scheduled route. Yet another driving mode is an auto pilot or autonomous driving mode 122 corresponding to level 3 of the classification system and corresponding to the second parts 123 of the scheduled route. Each circle part 118, 120, 122, has a length corresponding to the part of the route where this driving mode is assigned. The length of the circle part may illustrate the length in distance, e.g. Kilometers, of this part, the time length, e.g. minutes, of this part etc. The interface 116 may illustrate the present time, e.g. 7:05, the departure time, e.g. 7:25, and the arrival time, e.g. 8:00, of the scheduled route.

The interfaces 110, 112, 114, 116 are configured to be arranged in the vehicle 108 of FIG. 2.

Figure 4:
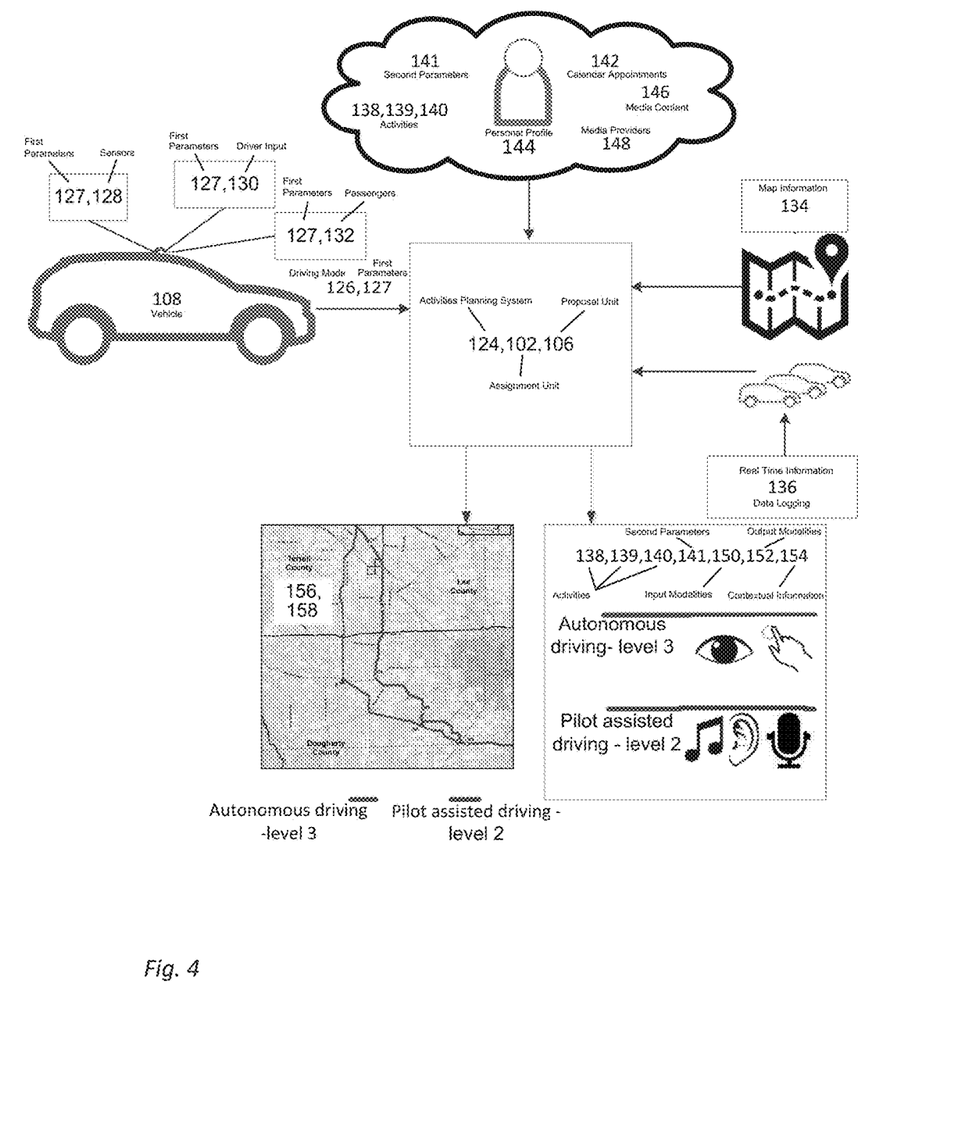
FIG. 4 schematically illustrates an exemplary embodiment of the system.

FIG. 4 schematically illustrates an exemplary embodiment of the system. The system 124 may comprise an assignment unit 102 and a proposal unit 106 which together calculate the efficient use of time. The system 124 may calculate or use as input the current or planned driving mode 126. The driving mode of the vehicle 108 may be based on one or more first parameters 127, such as determined by sensors 128 in the vehicle 108, driver input 130 and/or passengers 132.

The system 124 may predict the different driving modes of the different the parts of the route, e.g. in the form of the time available in the different driving modes on the route. The system 124 may determine the driving mode based on one or more first parameters 127, such as by using map information 134 as input for this determination. The map information 134 may enable prediction of the type, location and duration of different driving modes, which may be termed driving mode support, en route to destination based on map data.

The system 124 may use real-time information 136 as input for predicting the driving modes of the different parts of the route. The real-time information 136 may comprise data-logging and/or sharing of information from other vehicles on the road.

The system 124 may determine which type of activities 138 and media content 146 should be available, e.g., auditory, visual and/or manual, in the different driving modes based on one or more second parameters 141. The activities 138 may be based on second parameters 141 such as calendar appointments 142. The activities 138 may be based on second parameters 141 such as a personal profile 144. The personal profile 144 may comprise e.g. calendar appointments, to-do lists, planned activities, and personal preferences. The personal profile 144 may be based on preferred media content 146 and/or media providers 148. The media content 146 and/or media providers 148 may be social media, streaming services, internet browsers etc.

The system 124 may determine which input modalities 150 should be available for the proposed activities 138 to the driver, e.g. voice, visual, and/or manual. The system 124 may determine which output modalities 152 should be available for the proposed activities 138 for the driver, e.g. visual and/or auditory. The system 124 may use contextual information 154, such as the occupants of the vehicle, e.g. driver and any passengers. The system 124 may use contextual information 154, such as the destination of the route, the time-of-day etc. Thus the activity planning may provide content proposals for the current or planned driving situation, such as driving modes, and may include the appropriate modality for the different driving modes. For example for the pilot assisted driving mode corresponding to level 2 of the classification system, the input and output modalities may be auditory, and thus proposals for activities, i.e. the first activities 139, may comprise audio podcasts, email read-aloud, voice-to-text etc. For example for the autonomous driving mode corresponding to level 3 of the classification system, the input and output modalities may be visual and manual, and thus proposals for activities, i.e. the second activities 140, may comprise video podcasts, email reading, text input etc.

The system 124 may calculate an appropriate route 156 based on e.g. the personal profile 144, if there are more routes 156 available to the destination. The map 158 shows that two routes 156 are available to the destination. The route to the left in the map 158 may be a route comprising mainly pilot assisted driving and the route to the right in the map 158 may be a route comprising mainly autonomous driving. Based on the driver's personal profile 144 one of these two routes may be preferred and thus selected as the appropriate route.

It should be noted that the system 100, 124, assignment unit 102, interface(s) or interface unit(s) 104, 110, 112, 114, 116, execution unit 105, proposal unit 106, sensors 128 and/or any other system, unit, arrangement, controller and/or device described herein may each comprise one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other.

It should also be noted that the vehicle 108, system 100, 124, assignment unit 102, interface(s) or interface unit(s) 104, 110, 112, 114, 116, execution unit 105, proposal unit 106, sensors 128 and/or any other system, unit, arrangement, controller and/or device described herein may each further comprise or be arranged or configured to cooperate with any type of storage device or arrangement known in the art, such as optical, solid state, disk and/or tape storage devices and controllers and/or one or more storage area networks, which may for example be used for storing the various parameters, data, modes, levels, profiles, maps, routes, parts, appointments, activities, modalities, information, content, providers, input, output and/or any other type of information described herein. The vehicle 108, system 100, 124, assignment unit 102, interface(s) or interface unit(s) 104, 110, 112, 114, 116, execution unit 105, proposal unit 106, sensors 128 and/or any other system, unit, arrangement, controller and/or device described herein may each further comprise any computer hardware and software and/or electrical hardware known in the art configured to enable communication therebetween and/or with any other system, unit, arrangement and/or device necessary or desired, which may include cellular and/or other wireless networks.

Figure 5:
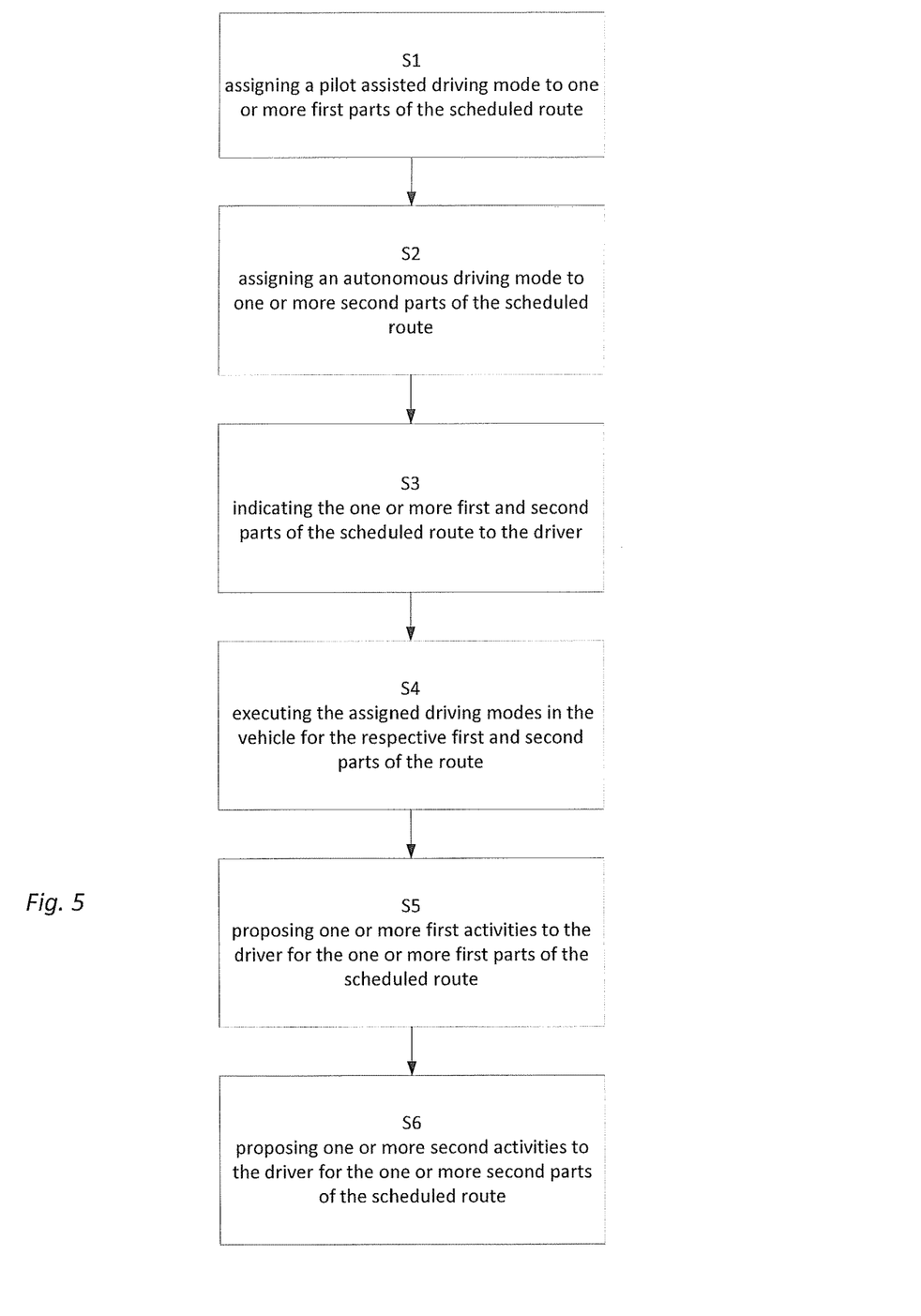
FIG. 5 schematically illustrates an exemplary embodiment of the method.

FIG. 5 schematically illustrates an exemplary embodiment of a method for planning activities for a driver of a vehicle, where a scheduled route is planned for the vehicle to drive along. The method comprises:

In S1 a pilot assisted driving mode is assigned to one or more first parts of the scheduled route by an assignment unit.

In S2 an autonomous driving mode is assigned to one or more second parts of the scheduled route by the assignment unit.

The assignment of the driving mode is determined based on one or more first parameters.

In S3 the one or more first and second parts of the scheduled route is indicated to the driver by at least one interface.

In S4 the assigned driving modes is executed in the vehicle for the respective first and second parts of the route by an execution unit.

In S5 one or more first activities are proposed to the driver for the one or more first parts of the scheduled route by a proposal unit.

In S6 one or more second activities are proposed to the driver for the one or more second parts of the scheduled route by the proposal unit.

The proposal of the activity is determined based on one or more second parameters.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented by a computer program product, embodied in a computer-readable medium, including computer-executable instructions, such as program code, executed by computers in networked environments. A computer-readable medium may include removable and non-removable storage devices including, but not limited to, read only memory (rom), random access memory (ram), compact discs (cds), digital versatile discs (dvd), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

REFERENCES 100,124 system
102 assignment unit
104 at least one interface
105 execution unit
106 proposal unit
108 vehicle
110,112,114,116 interfaces
118 manual driving mode, level 0
119 third parts the scheduled route
120 pilot assisted driving mode, level 2
121 first parts of the scheduled route
122 auto pilot, autonomous driving mode, level 3
123 the second parts of the scheduled route.
126 driving mode
127 one or more first parameters
128 sensors
130 driver input
132 passengers
134 map information
136 real-time information, data-logging
138 activities
139 first activities
140 second activities
141 one or more second parameters
142 calendar appointments
144 personal profile
146 media content
148 media providers
150 input modalities
152 output modalities
154 contextual information
156 route
158 map

What is claimed is:

1. A system for planning activities for a driver of a vehicle, where a route is planned for the vehicle to drive along by a route planning device in the vehicle, the system comprising:
an assignment unit configured for assigning a driving mode, comprising a pilot assisted driving mode or an autonomous driving mode, the pilot assisted driving mode, wherein at least two vehicle controls can be automated in unison, assigned to one or more first parts of the planned route, and the autonomous driving mode assigned to one or more second parts of the planned route, wherein the assignment of the driving mode is determined based on one or more first parameters;
at least one interface configured for indicating the one or more first and second parts of the planned route to the driver; and
a proposal unit configured for proposing, upon execution of the assigned driving mode in the vehicle, one or more first in-vehicle activities to the driver for the one or more first parts of the planned route, and for proposing one or more second in-vehicle activities to the driver for the one or more second parts of the planned route, wherein each proposal of an activity is determined based on one or more second parameters;
wherein the one or more proposed first and second in-vehicle activities, respectively, are based on a requirement of attention of the driver in the one or more first and second parts of the planned route, respectively, wherein the one or more first parts of the planned route require visual attention of the driver on a road and/or traffic, and the one or more second parts of the planned route allow visual attention of the driver to be diverted from the road and/or traffic, and wherein the system is configured for selecting the planned route from a selection of at least two possible routes, the selection of the planned route based on a personal profile of the driver, wherein the personal profile of the driver comprises calendar appointments, to-do lists, or planned activities; and
wherein the system is configured for shutting down a media content transmitted to the driver in response to the one or more first and/or second parts of the planned route having been traveled.

2. The system according to claim 1 wherein the one or more first parameters comprise one or more of a type of road, traffic conditions, weather conditions, and availability of map information.

3. The system according to claim 1 wherein the one or more second parameters comprise one or more of a time length of the first part and the second part of the planned route, the driving mode assigned to the first part and the second part of the planned route, the personal profile of the driver, and a predefined preference of the driver.

4. The system according to claim 1 wherein the one or more proposed first and the second activities are customized for the driver, and wherein the customization of activities in the form of media content is based on the personal profile of the driver comprising areas of interest, gender, age, predefined media providers and/or predefined media content.

5. The system according to claim 1 wherein the system is configured for providing the driver with an option of storing an activity to be proposed.

6. The system according to claim 1 wherein the system comprises one or more interfaces, including the at least one interface for indicating the first and second parts of the planned route, and wherein the system is configured for displaying on the one or more interfaces each of the activities and corresponding lengths of time periods for each activity.

7. The system according to claim 1 wherein the system is configured for calculating and/or obtaining the one or more first and second parts of the planned route based on one or more of destination, route, traffic conditions, road types, road characteristics, map information, crowd sourcing and/or data logging.

8. A vehicle comprising:
a system for planning activities for a driver of a vehicle, where a route is planned for the vehicle to drive along by a route planning device in the vehicle, the system comprising,
an assignment unit configured for assigning a driving mode comprising a pilot assisted driving mode or an autonomous driving mode, the pilot assisted driving mode, wherein at least two vehicle controls can be automated in unison, assigned to one or more first parts of the planned route, and the autonomous driving mode assigned to one or more second parts of the planned route, wherein the assignment of the driving mode is determined based on one or more first parameters;
at least one interface configured for indicating the one or more first and second parts of the planned route to the driver; and
a proposal unit configured for proposing, upon execution of the assigned driving mode in the vehicle, one or more first in-vehicle activities to the driver for the one or more first parts of the planned route, and for proposing one or more second in-vehicle activities to the driver for the one or more second parts of the planned route, wherein each proposal of an activity is determined based on one or more second parameters;
wherein the one or more proposed first and second in-vehicle activities, respectively, are based on a requirement of attention of the driver in the one or more first and second parts of the planned route, respectively, wherein the one or more first parts of the planned route require visual attention of the driver on a road and/or traffic, and the one or more second parts of the planned route allow visual attention of the driver to be diverted from the road and/or traffic, and wherein the system is configured for selecting the planned route from a selection of at least two possible routes, the selection of the planned route based on a personal profile of the driver, wherein the personal profile of the driver comprises calendar appointments, to-do lists, or planned activities; and
wherein the system is configured for shutting down a media content transmitted to the driver in response to the one or more first and/or second parts of the planned route having been traveled.

9. A method for planning activities for a driver of a vehicle, where a route is planned for the vehicle to drive along by a route planning device in the vehicle, the method comprising:
assigning a pilot assisted driving mode, wherein at least two vehicle controls can be automated in unison, to one or more first parts of the planned route by an assignment unit configured for assigning a driving mode;
assigning an autonomous driving mode to one or more second parts of the planned route by the assignment unit;
indicating the one or more first and second parts of the planned route to the driver by at least one interface;
executing the assigned driving modes in the vehicle for the respective first and second parts of the planned route by an execution unit;
proposing one or more first in-vehicle activities to the driver for the one or more first parts of the planned route by a proposal unit; and
proposing one or more second in-vehicle activities to the driver for the one or more second parts of the planned route by the proposal unit;
wherein the assignment of the driving mode is determined based on one or more first parameters, and each proposal of an activity is determined based on one or more second parameters, and wherein the one or more proposed first and second in-vehicle activities, respectively, are based on a requirement of attention of the driver in the one or more first and second parts of the planned route, respectively, wherein the one or more first parts of the planned route require visual attention of the driver on a road and/or traffic, and the one or more second parts of the planned route allow visual attention of the driver to be diverted from the road and/or traffic, and wherein the system is configured for selecting the planned route from a selection of at least two possible routes, the selection of the planned route based on a personal profile of the driver, wherein the personal profile of the driver comprises calendar appointments, to-do lists, or planned activities; and
shutting down a media content transmitted to the driver in response to the one or more first and/or second parts of the planned route having been traveled.

10. A non-transitory storage medium comprising computer executable instructions for use in a system for planning activities for a driver of a vehicle, where a route is planned for the vehicle to drive along by a route planning device in the vehicle, wherein when the instructions are executed the system is operable to:
assign a pilot assisted driving mode, wherein at least two vehicle controls can be automated in unison, to one or more first parts of the planned route;
assign an autonomous driving mode to one or more second parts of the planned route;
indicate the one or more first and second parts of the planned route to the driver;
execute the assigned driving modes in the vehicle for the respective first and second parts of the planned route;
propose one or more first in-vehicle activities to the driver for the one or more first parts of the planned route; and propose one or more second in-vehicle activities to the driver for the one or more second parts of the planned route;

wherein the assignment of the pilot assisted and autonomous driving modes is determined based on one or more first parameters, and each proposal of an activity is determined based on one or more second parameters, and wherein the one or more proposed first and second in-vehicle activities, respectively, are based on a requirement of attention of the driver in the one or more first and second parts of the planned route, respectively, wherein the one or more first parts of the planned route require visual attention of the driver on a road and/or traffic, and the one or more second parts of the planned route allow visual attention of the driver to be diverted from the road and/or traffic, and wherein the system is configured for selecting the planned route from a selection of at least two possible routes, the selection of the planned route based on a personal profile of the driver, wherein the personal profile of the driver comprises calendar appointments, to-do lists, or planned activities; and shut down a media content transmitted to the driver in response to the one or more first and/or second parts of the planned route having been traveled.

* * * * *